United States Patent [19]

Hons

[11] Patent Number: 4,875,153

[45] Date of Patent: Oct. 17, 1989

[54] MECHANISM FOR ACCURATELY MOUNTING AN ELECTRONIC LIGHT EMITTING PRINTHEAD ASSEMBLY

[75] Inventor: Douglas A. Hons, Rochester, N.Y.

[73] Assignee: Eastman Kodak Company, Rochester, N.Y.

[21] Appl. No.: 279,737

[22] Filed: Dec. 5, 1988

[51] Int. Cl.[4] .............................................. G01J 15/00

[52] U.S. Cl. .................................... 346/155; 346/145; 346/160

[58] Field of Search ..................... 346/150, 153.1, 160, 346/145, 139 C, 155; 400/119; 355/3 R; 350/358

[56] References Cited

U.S. PATENT DOCUMENTS

| | | | |
|---|---|---|---|
| 4,538,896 | 9/1985 | Tajima et al. | 355/3 R |
| 4,653,894 | 3/1987 | Pease | 355/1 |
| 4,699,497 | 10/1987 | Hinton et al. | 355/3 R |
| 4,774,531 | 9/1988 | Tokita | 346/145 |
| 4,821,051 | 3/1989 | Ibediger | 346/160 |

*Primary Examiner*—Arthur G. Evans
*Attorney, Agent, or Firm*—Lawrence P. Kessler

[57] ABSTRACT

In a reproduction apparatus including an image receiving member, at least one support for mounting the image receiving member for movement along a travel path, and an electronic light emitting print head assembly including a focusing lens, a simplified mechanism for accurately locating an electronic print head assembly relative to the image receiving member, which enables the image receiving member to be readily changed and which does not impact tracking of the member. The mechanism comprises a frame with the print head assembly mounted at a preselected location in the frame. A first feature is defined in the frame, the first feature including a locating surface spaced at a preselected distance from the plane through the geometric center line of the focusing lens of the print head assembly. Also, a second feature is defined by the frame, the second feature including a pair of interconnected locating surfaces, the first of the pair of locating surfaces spaced at a preselected distance from the plane through the geometric center line of the focusing lens, and the second of the pair of locating surfaces spaced at a preselected distance from the image plane of the focusing lens. The frame is urged in a direction such that the first feature engages a locating member and the second feature engages the support for the image receiving member.

14 Claims, 4 Drawing Sheets

MECHANISM FOR ACCURATELY MOUNTING AN ELECTRONIC LIGHT EMITTING PRINTHEAD ASSEMBLY

BACKGROUND OF THE INVENTION

This invention is directed in general to reproduction apparatus, and more particularly to a mechanism for accurately locating an electronic light emitting print head assembly in a reproduction apparatus relative to an image receiving member.

In reproduction apparatus, such as electrostatographic reproduction apparatus for example, it is general practice ro provide an electrostatic image receiving member movable along a path relative to electrostatographic process stations. The electrostatic image receiving member may be a dielectric web guided for movement along the path by support rollers. In the electrostatographic process stations, a uniform electrostatic charge is applied to the dielectric member web and such charge is modified in an area of the web to form, in such area, a latent image charge pattern corresponding to information to be reproduced. The latent image charge pattern is then developed by applying pigmented marking particles to the web, and the developed image is then transferred to a final receiver member and fixed thereto by heat and/or pressure for example.

The mechanism by which modification of the uniform electrostatic charge pattern to form the latent image is accomplished is dependent upon the characteristics of the dielectric member. For example, if the dielectric member is of the type which merely retains charge on its surface, charge modification may be accomplished by selectively activating any of a plurality of electrodes to deposit or remove charge in selected areas of the member. If, on the other hand, the dielectric member is of the type having a photoconductive layer, charge modification is accomplished by exposing the member to light in an image-wise pattern.

Exposing of a dielectric member having a photoconductive layer has typically been accomplished by one of two methods. One method of exposure involves forming a light image of a document (generally referred to as optical copying). In this method, light is directed from a lamp assembly at a document with the light reflected from (or transmitted through) the document being directed through a lens unit into focus on the photoconductive surface. The light from the lamp may illuminate the entire document at one time (referred to as flash exposure), or may be passed through a slit and mòved relative to the document to illuminate successive line segments of the document (referred to as scan exposure).

The second method of exposure involves the use of an electronically controlled light emitting print head assembly (generally referred to as nonimpact printing). Examples of electronically controlled light emitting print head assemblies include electro-optic gating devices, or arrays of light emitting diodes (LED's). The light emitting elements of an electronic print head assembly are selectively turned on and off to produce individual beams of light focused on the photoconductive layer of the image receiving member in order to expose the photoconductive layer in a line-by-line fashion. Information to be reproduced is electronically generated and is used to control the turning on and off of the light emitting print head assembly elements to form a desired charge pattern creating a latent image on the member corresponding in an imagewise configuration to the information to be reproduced.

The positioning of the print head assembly relative to the photoconductive layer of the image receiving member is of critical importance to assure that the light from the individual light emitting elements are in accurate focus on the photoconductive layer. U.S. Pat. No. 4,703,334 (issued Oct. 27, 1987, in the names of Mochimaru et al) shows a mechanism for positioning an electronically controlled light emitting print head assembly relative to an image receiving member. The mechanism of the Mochimaru et al patent requires structure to effect deflection of the image receiving member by a back-up roller associated with the print head assembly. This arrangement complicates the construction of the positioning mechanism and may adversely effect tracking of the image receiving member about its travel path. Further, it does not easily accommodate for necessary periodic changing of the image receiving member.

SUMMARY OF THE INVENTION

This invention is directed to a simplified mechanism for accurately locating an electronic print head assembly in a reproduction apparatus relative to an image receiving member, which enables the image receiving member to be readily changed and which does not impact tracking of the member. In a reproduction apparatus including an image receiving member, at least one support for mounting the image receiving member for movement along a travel path, and an electronic light emitting print head assembly including a focusing lens, a mechanism according to this invention is provided for accurately mounting the electronic print head assembly relative to the image receiving member. The mechanism comprises a frame with the print head assembly mounted at a preselected location in the frame. A first feature is defined in the frame, the first feature including a locating surface spaced at a preselected distance from the plane through the geometric center line of the focusing lens of the print head assembly. Also, a second feature is defined by the frame, the second feature including a pair of interconnected locating surfaces, the first of the pair of locating surfaces spaced at a preselected distance from the plane through the geometric center line of the focusing lens, and the second of the pair of locating surfaces spaced at a preselected distance from the image plane of the focusing lens. The frame is urged in a direction such that the first feature engages a locating member and the second feature engages the support for the image receiving member.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
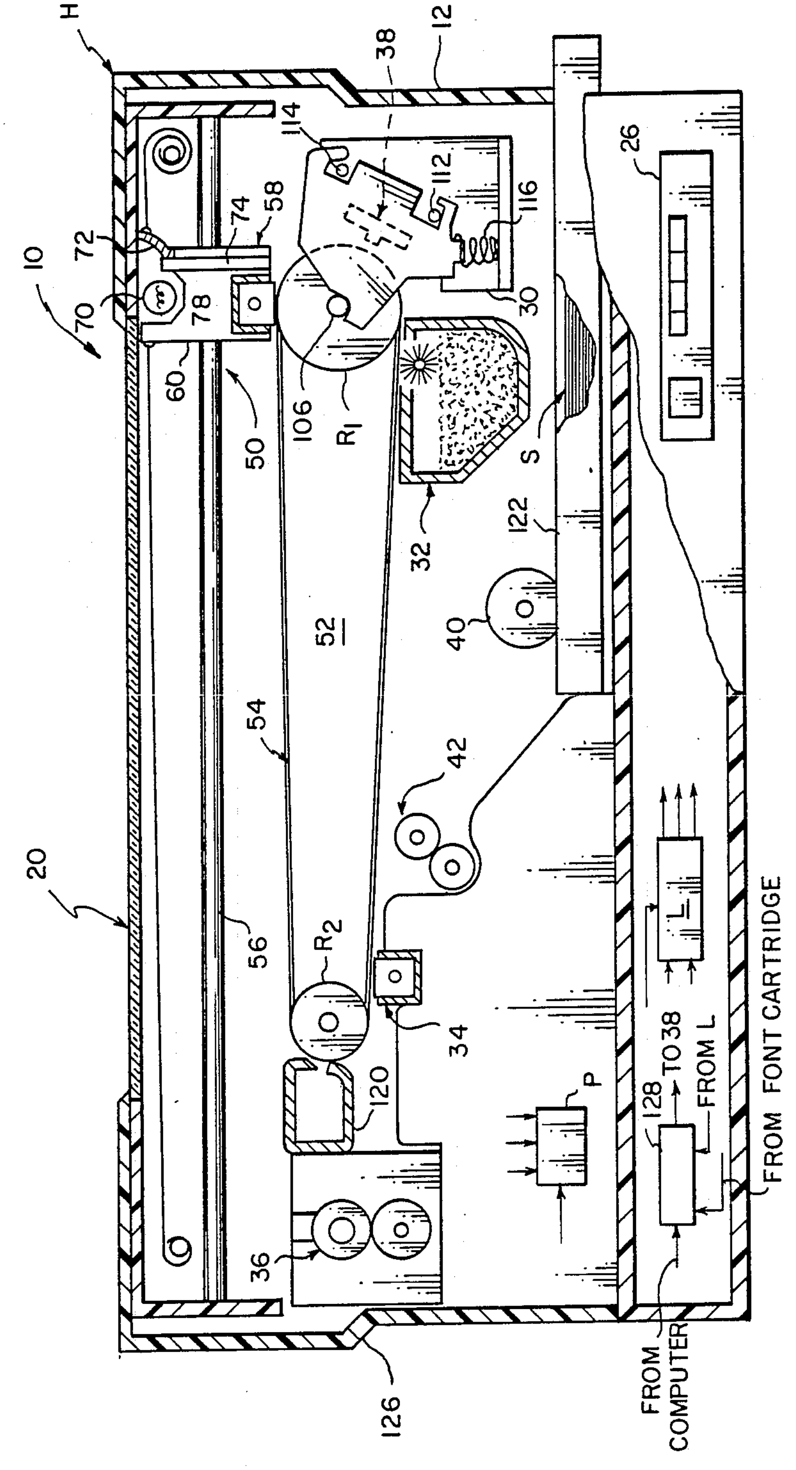
FIG. 1 is a schematic side elevational view, partly in cross-section, of an exemplary reproduction apparatus in which the mechanism for accurately mounting a print head assembly according to this invention is employed.

Referring now to the accompanying drawings, FIG. 1 shows a reproduction apparatus, designated generally by the numeral 10, particularly suitable for use with the print head assembly mounting mechanism according to this invention. Of course, the reproduction apparatus 10 is only exemplary, and this invention is suitable for use with other reproduction apparatus utilizing an electronic light emitting print head assembly. The reproduction apparatus 10 and its operation, which are fully disclosed in U.S. patent application Ser. No. 081,765, filed Aug. 5, 1987, in the name of Bruce, Jr., are described herein only in such detail as to permit a full understanding of this invention.

The reproduction apparatus 10, of the electrostatographic type, includes a housing H having a lower portion 12 and an upper portion 14 interconnected by a hinge mechanism (not shown). The upper housing portion 12 can thus be pivoted relative to the lower housing portion 14 for location in a closed position where the various electrostatographic elements are operatively interrelated, or in an opened position (not shown) to permit access to the interior of the apparatus 10. The upper portion 14 has a stationary transparent platen 20, formed in the top surface **14*a* thereof, for supporting a document to be optically reproduced. A control panel 26, located at the bottom front of the housing H, is operatively coupled to a logic and control unit L for the apparatus 10, and enables an operator to select operating parameters for the apparatus and monitor its functions. The logic and control unit L includes, for example, a microprocessor receiving operator input signals and timing signals. Based on such signals and a program from the microprocessor, the unit L produces signals to control the operation of the apparatus 10** for carrying out the reproduction process.

Various elements utilized in the electrostatographic process for image reproduction are located within the lower portion 12 of the housing H. Such elements include, for example, a magnetic brush developer station 32, a transfer charger 34, a heat/pressure fuser assembly 36, a receiver member feed mechanism 40, receiver member registration mechanism 42, and a drive assembly (not shown) for effecting operation of various components and elements of the apparatus 10. The upper portion 14 of the housing H contains a rigid supporting member 46. The supporting member 46 serves to locate and relatively position an optical exposure assembly 50 and an assembly 52 for supporting an image receiving member in the form of a continuous photoconductive belt 54. The photoconductive belt 54 is a composite dielectric member including a typical photoconductive material layer such as shown, for example, in U.S. Pat. No. 3,615,414, issued Oct. 26, 1971 in the name of Light. Of course, other organic or inorganic photoconductive materials are suitable for use with this reproduction apparatus.

In the operation of the electrostatographic reproduction apparatus 10 for making optical reproductions of documents, a document to be reproduced is placed on the platen 20 and the operator programs the apparatus for a desired number of reproductions, for example, by inputting such information to the logic and control unit L through the operator control panel 26. When the operator depresses a start button on the panel 26, the logic and control unit L actuates the drive assembly to move a carriage 58 of the optical assembly 50 from its position shown in FIG. 1, along rails 56 under the planten 20, to a position at the far left of the rails. The carriage 58 includes a housing 60 which supports an exposure lamp 70 and an integral reflector 72 to direct light from the lamp 70, when energized, in a line segment toward the platen 20. Such light reflects off of a document on the platen as the carriage 58 is moved along the rails 56. A linear lens array 74, supported by the housing 60, focuses the reflected light image on the photoconductive belt 54. The housing 60 also supports a primary corona charger 78, which is located immediately upstream of the lens array 74, energized by a power supply source P to provide for placement of a uniform electrostatic charge on the photoconductive belt 54. As this right-to-left carriage movement is begun, the primary charger 78 is activated and the lamp 70 is turned on. The primary charger 78 deposits a uniform electrostatic charge on the photoconductive belt which is subsequently modified, in a line-by-line fashion, to form the latent image charge pattern by scan projection of the focused light reflected image of the document provided through the lens assembly 74 oriented in the housing 58 immediately behind the primary charger.

At the end of travel of the carriage 58, the primary charger 78 and lamp 70 are turned off, and the housing is returned (to the right) to its parked position, Substantially simultaneously, the drive assembly initiates drive of the photoconductive belt supporting rollers $R_1$, $R_2$ to transport the belt 54 clockwise in a closed loop path about the rollers. the area of the belt containing the latent image charge pattern is thus successively transported through the electrostatographic process stations. That is, such area is brought into operative association with the developer station 32 where pigmented marking particles are adhered to the charge pattern to develop a transferable image, to the area beneath the transfer charger 34 where such image is transferred to a receiver member, and then through a cleaning station 120 where any residual marking particles are removed prior to reuse of that area of the belt.

At a proper time determined by the logic and control unit L, a feed mechanism 40 is actuated and picks the top most receiver member (e.g., cut sheet S) from a cassette 122 and transports such sheet to a receiver member registration mechanism 42. The registration mechanism 42 adjusts the timing of the transport of the receiver member so that the member is delivered into contact with the photoconductive belt 54 at the vicinity of the transfer charger 34 in register with the transferable image on the belt. As the receiver member and the photoconductive belt pass beneath the transfer charger 34, such charger is activated to generate an electrical field which causes the marking particles to migrate from the belt to the receiver sheet. After transfer, the receiver sheet passes from the photoconductive belt 54 to the fuser assembly 36 where the transferred image is fixed to the sheet by heat and/or pressure, and delivered through an exit slot 126 in the lower portion 12 of the housing H for operator retrieval of the finished reproduction.

Reproduction apparatus 10 is also capable of reproducing electronically generated information. Electronically generated information is typically produced by a host computer (or computers) interfacing with the apparatus 10. The information from the computer, in the form of digital electrical signals, is fed to a raster image processor (RIP) 128 under the control of the unit L. The RIP 128 also interfaces with a font cartridge which directs the RIP to form the signals from the computer into a serial train of signals in a particular form corresponding, for example, to a particular style type face for the reproduction. The RIP 128 then feeds the appropriate signal train to a driver coupled to a print head assembly assembly 38 for reproducing electrically generated information so as to activate the assembly for reproducing the signals in the selected image pattern by appropriate exposure of the photoconductive belt 54. For example, in the illustrated embodiment the print head assembly 38 includes a housing 38*a*, incorporating a plurality of LED's and appropriate drivers $D_1$, $D_2$, $D_n$, and a lens 38*b*, such as a gradient index fiber array. The LED's (extending across the belt in the direction transverse to belt movement) are selectively turned on by the drivers to produce light beams which are respectively focused by the lens array for the desired exposure of the belt. Of course, other mechanisms for reproducing electronically generated information, such as an electro-optic gating device for example, are suitable for use with this invention.

When a host computer communicates with the apparatus 10, the logic and control unit L actuates the drive assembly to initiate drive of the photoconductive belt supporting rollers $R_1$, $R_2$ to transport the belt 54 clockwise (when viewing FIG. 2) in a closed loop path about the rollers. Substantially simultaneously the primary charger 78 is activated (with the carriage 58 remaining in its position shown in FIG. 1). The primary charger deposits a uniform electrostatic charge on the photoconductive belt which is subsequently modified to form the latent image charge pattern by the activation of the print head assembly 38 for scan printing electrically generated information. As with the above described operative cycle for reproducing documents, the area of the belt containing the modified latent image charge pattern is successively transported through the electrostatographic process stations in the same manner. That is, image development, receiver member delivery, transfer, fusing, and photoconductive belt cleaning are carried out as described above.

Figure 2:
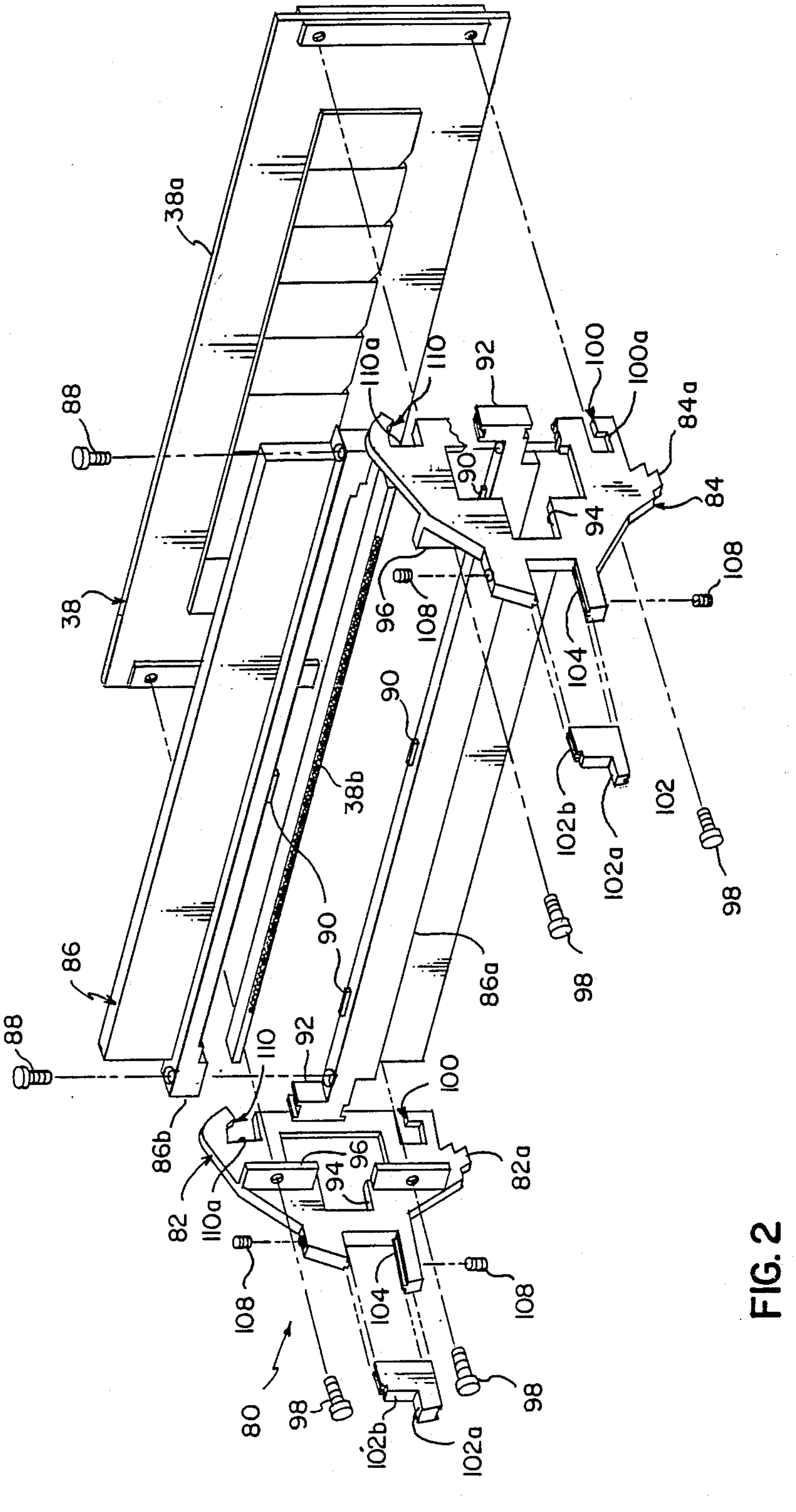
FIG. 2 is an exploded view, in perspective of the print head assembly and a portion of the mechanism to which the print head assembly is mounted.
Figure 3:
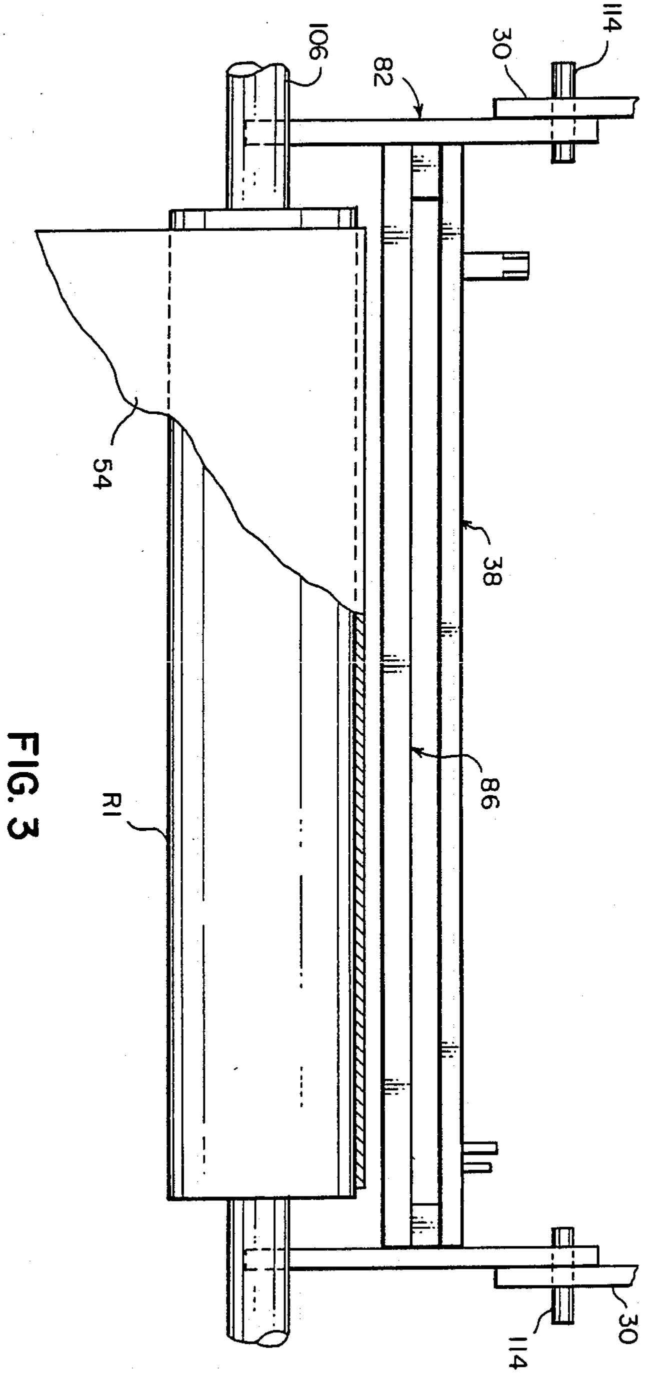
FIG. 3 is a top elevational view of the mechanism for accurately mounting a print head assembly, with portions removed to facilitate viewing.

According to this invention, the print head assembly 38 is mounted for accurate location relative to the belt 54 to assure that the light from the LED's is properly focused on the belt. As best shown in FIGS. 2 and 3, the mechanism for mounting the print head assembly 38, designated generally by the numeral 80, comprises a frame including a pair of end plates 82, 84 interconnected by a support assembly 86. the support assembly 86 incorporates a pair of members 86*a*, 86*b* held together by screws 88 (see FIG. 2). When held together, the members 86*a*, 86*b* form a cavity with locating stops 90 for accurately locating the lens array 38*b* therein. Of course, the assembly 86 could be formed as a single unit with an integral lens array. The ends of member 86*a* are formed with mounting blocks 92 which are slidably received respectively in channels 94 of the end plates. The end plates 82, 84 also respectively have an inwardly facing ear 96 to which the housing 38*a* of the print head assembly 38 is attached by screws 98. The housing 38*a*, when screwed to the ears 96, entraps the support assembly 86 so that the lens array 38*b* is lcoated in a preselected relation to the LED's in the housing.

The end plates 82, 84 respectively have a plurality of integrally incorporated features which enable the print head assembly 38, attached thereto, to be particularly located in the apparatus 10. A first feature, designated by the numeral 100, is a slot having an enlarged portion with a locating surface 100*a*. The surface 100*a* is parallel to, and a preselected distance from, the plane through the geometric center line of the lens array 38*b*. A second feature, designated by the numeral 102, is a member having a pair of interconnected bearing surfaces 102*a*, 102*b*. The members of each of the second features 102 are adjustably received in channels 104 respectively formed in the end plates 82, 84. The surface 102*a* is parallel to, and a preselected distance from, the plane through the geometric center line of the lens array 38*b*. The surface 102*b* is substantially perpendicular to the surface 102*a* and is located such that it is at a preselected distance from the image plane of the lens array 38*b*. Since the location of the image plane of the print head assembly is dependent upon the overall conjugate of its particular lens array, the members of the second features 102 are slidably adjustable in the channels 104. Once the second features are properly adjusted in the channels 104 to set the location of the image plane relative thereto, they are secured in such position by set screws 108. The preselected distance for the surface 102*a* is substantially equal to the radius of the shaft 106 supporting the roller $R_1$ (see FIG. 1), while the preselected distance for the surface 102*b* is substantially equal to the radius of the roller $R_1$ plus the thickness of the belt 54 less the radius of the shaft 106. As such, when the shaft 106 is respectively seated, in the manner to be explained hereinbelow, in the second features 102 against the locating surfaces 102*a* and 102*b*, the image plane of the print head assembly 38 is accurately focused at the surface of the belt 54 supported on the roller $R_1$. A third feature, designated by the numeral 110, is a slot having an enlarged portion with a locating surface 110*a*.

Figure 4:
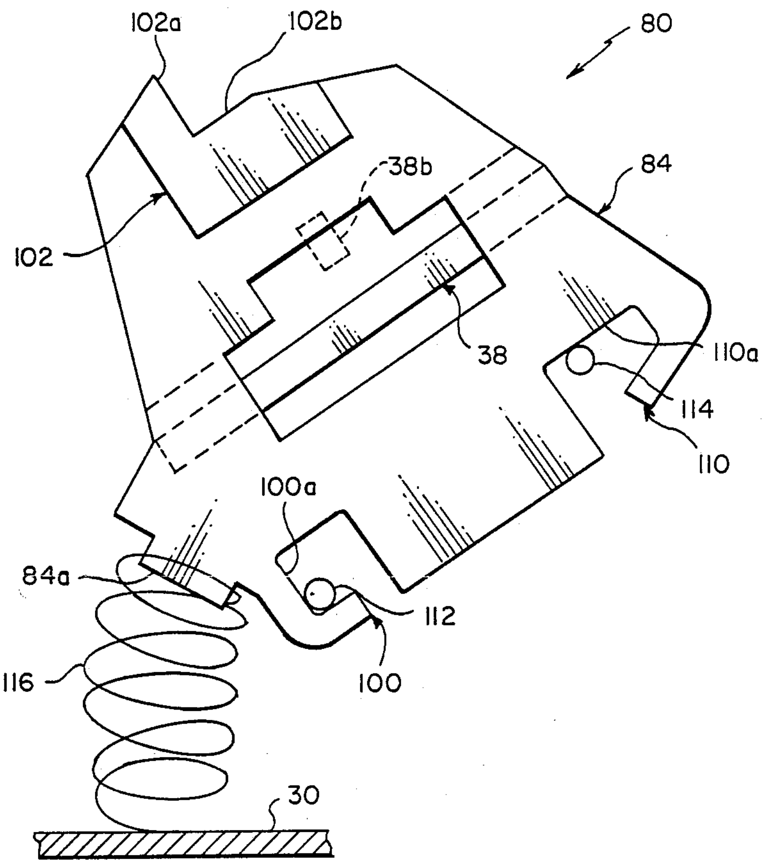
FIG. 4 is a side elevational view of the mechanism for accurately mounting a print head assembly, with portions removed to facilitate viewing, shown in its position with the image receiving member removed.

Pairs of pins 112, 114, and compression springs 116 (one shown in FIGS. 1 and 4), located within the reproduction apparatus 10, cooperate with the end plates 82, 84 so as to effect accurate positioning of the print head assembly 38 within the reproduction apparatus. The pair of pins 112 are attached to a support 30 located in the lower housing portion 12, and positioned at a distance from the axis of the shaft 106 substantially equal to the straight line distance from the center of the slot of a first feature 100 to the surface 102*b* of an associated second feature plus the radius of the shaft 106. The pair of pins 114 are similarly attached to the support 30. Such pins are positioned at a distance from the axis of the shaft 106 marginally greater than the distance of the pair of pins 112 from the axis of the shaft 106, and at a distance from the pair of pins 112 substantially equal to the distance between the slots of a first feature 100 and an associated third feature 110. The springs 116 are also attached to the support 30 respectively at one end, and are adapted to have the opposite end seatably engage posts 82*a*, 84*a* of the end plates 82, 84.

As will be readily appreciated, with the top housing portion 14 opened and the belt support assembly 52 located out of the way (such as for changing the belt thereon for example), the print head assembly 38 is mounted in the reproduction apparatus 10 by inserting the structure into the interior of the apparatus housing H such that pair of pins 112 respectively enter the slots of the first features 100, a pair of pins 114 respectively enter the slots of the third feature 110, and the springs 116 respectively engage the posts 82*a*, 84*a*. The springs 116 urge the end plates 82, 84 (and the associated structure) in a direction to the position shown in FIG. 4 where surface 100*a* of the features 110 will engage the pins 114. Of course, the print head assembly is easily removed from the apparatus 10 by merely reversing the described insertion procedure. In this manner, mechanism 80 also allows the print head assembly to be easily installed in the reproduction apparatus 10, and further it does not interfere with the belt support assembly 52 so that the belt can be readily replaced and accurately relocated relative to the print head assembly.

Thereafter, when the assembly 52 is moved to its position shown in FIG. 1 where belt 54 is in operative relation with the electrostatographic process stations, shaft 106 will seat in the second features 102 against the surfaces 102*a* and 102*b*. The urging of the springs 116 assures positive engagement of each of the second features 102 of the respective end plates 82, 84 individually with the shaft 106. Due to the aforementioned preselected dimensions of the features 100 and 102 of the end plates and the urging of the springs 116, the print head assembly is accurately located relative to the surface of the belt 54 to provide focusing of the light beams of the LED's at the belt surface, and maintain such accurate location. Since the mechanism 80 is associated only with the shaft 106 of the belt supporting assembly 52 and follows any movement thereof when the assembly is in the position of FIG. 1, the mechanism imparts no additional forces on the belt 54 which might otherwise adversely impact belt tracking.

The invention has been described in detail with particular reference to a preferred embodiment thereof, but it will be understood that variations and modifications can be effected within the spirit and scope of the invention as described hereinabove and as defined in the appended claims.

I claim:

1. In a reproduction apparatus including an image receiving member, at least one support for said image receiving member, and an electronic light emitting print head assembly including light emitting elements and a focusing lens, a mechanism for accurately mounting said electronic print head assembly relative to said image receiving member, said mechanism comprising:

a frame; means for mounting said print head assembly at a preselected location in said frame; a first feature defined in said frame, said first feature including a locating surface spaced at a preselected distance from the plane through the geometric center line of said focusing lens of said print head assembly; a second feature defined by said frame, said second feature including a pair of interconnected locating surfaces, the first of said pair of locating surfaces spaced at a preselected distance from the plane through the geometric center line of said focusing lens, and the second of said pair of locating surfaces spaced at a preselected distance from the image plane of said focusing lens;

a locating member supported in said reproduction apparatus; and means for urging said frame in a direction such that said locating surface of said first feature engages said locating member and said second feature engages the support for said image receiving member.

2. The invention of claim 1 wherein said frame includes a pair of end plates, and a support assembly interconnecting said end plates.

3. The invention of claim 2 wherein said light emitting elements and said focusing lens are attached to said support assembly.

4. The invention of claim 2 wherein said support assembly includes a wall portion to which said light emitting elements of said print head assembly are attached, and defines a cavity having locating stops for positioning said focusing lens in said cavity relative to said light emitting elements.

5. The invention of claim 2 wherein said first feature and second feature are each located in said end plates.

6. The invention of claim 5 wherein said second feature includes a member adjustably positionable in each of said end plates.

7. The invention of claim 5 wherein said first feature includes a slot defined in each of said end plates, and said locating member includes a pair of pins adapted to be received respectively in said slots.

8. The invention of claim 7 wherein said urging means includes a spring engaging at least one of said end plates to urge said end plates in a direction where said pins engage said locating surface of said first features.

9. The invention of claim 8 wherein said image receiving member is a belt and said image receiving member support is a roller mounted on a shaft; and wherein said preselected distance of said first of said pair of locating surfaces is substantially equal to the radius of said shaft, and said preselected distance of said second of said pair of locating surfaces is substantially equal to the radius of said roller plus the thickness of said belt less the radius of said shaft.

10. In an electrostatographic reproduction apparatus including an electrostatic image receiving belt, at least one roller mounted on a shaft for supporting said image receiving belt, and an electronic light emitting print head assembly including light emitting elements and a focusing lens, a mechanism for accurately mounting said electronic print head assembly relative to said image receiving member, said mechanism comprising:

a support assembly including a wall portion to which said light emitting elements of said print head assembly are attached, and defining a cavity having locating stops for positioning said focusing lens in said cavity relative to said light emitting elements;

a pair of end plates attached to said support assembly, said end plates respectively having a first feature including a locating surface spaced at a preselected distance from the plane through the geometric center line of said focusing lens of said print head assembly, a second feature including a pair of interconnected locating surfaces, the first of said pair of locating surfaces spaced at a preselected distance from the plane through the geometric center line of said focusing lens, and the second of said pair of locating surfaces spaced at a preselected distance from the image plane of said focusing lens, and a third feature spaced from said first and second features;

a first locating member supported in said reproduction apparatus;

a second locating member supported in said reproduction apparatus; and means for urging said frame in a direction such that said locating surface of said first feature engages said first locating member and said second feature engages said roller shaft when said shaft is located in operative relation in said reproduction apparatus or said third feature when said shaft is located in a position remote from said operative position.

11. The invention of claim 10 wherein said second feature includes a member adjustably positionable in each of said end plates.

12. The invention of claim 10 wherein said first feature includes a slot defined in each of said end plates, and said second feature includes a slot defined in each of said end plates; and wherein said first locating member includes a pair of pins adapted to be received respectively in said slots of said first feature, and said second locating member includes a pair of pins adapted to be received respectively in said slots of said second feature.

13. The invention of claim 12 wherein said urging means includes a spring engaging at least one of said end plates to urge said end plates in a direction where said pins of said first locating member engage said locating surface of said first features.

14. The invention of claim 13 wherein said preselected distance of said first of said pair of locating surfaces is substantially equal to the radius of said shaft, and said preselected distance of said second of said pair of locating surfaces is substantially equal to the radius of said roller plus the thickness of said belt less the radius of said shaft.

* * * * *